United States Patent
Da Matta Navarro et al.

(10) Patent No.: US 11,966,934 B2
(45) Date of Patent: Apr. 23, 2024

(54) MACHINE LEARNING TECHNOLOGIES TO PREDICT OPPORTUNITIES FOR SPECIAL PRICING AGREEMENTS

(71) Applicant: WESCO Distribution, Inc., Pittsburgh, PA (US)

(72) Inventors: Rafael Da Matta Navarro, Houston, TX (US); Shashi Dande, Spring, TX (US); Juliana Kostrinsky, North York (CA); Benjamin Albu, Pittsburgh, PA (US); Richard Gigliotti, Gibsonia, PA (US); Edward Cerny, Pittsburgh, PA (US); Trevor Baumel, Pittsburgh, PA (US)

(73) Assignee: WESCO DISTRIBUTION, INC., Pittsburgh, PA (US)

( * ) Notice: Subject to any disclaimer, the term of this patent is extended or adjusted under 35 U.S.C. 154(b) by 0 days.

(21) Appl. No.: 17/734,307

(22) Filed: May 2, 2022

(65) Prior Publication Data

US 2023/0351420 A1    Nov. 2, 2023

(51) Int. Cl.
G06Q 30/02        (2023.01)
G06Q 30/0202      (2023.01)

(52) U.S. Cl.
CPC .................. *G06Q 30/0202* (2013.01)

(58) Field of Classification Search
None
See application file for complete search history.

(56) References Cited

U.S. PATENT DOCUMENTS

| 2006/0212350 A1* | 9/2006 | Ellis .................. G06Q 30/0254 |
| | | 705/14.66 |
| 2010/0017259 A1* | 1/2010 | Luo ........................ G06Q 30/02 |
| | | 705/400 |

(Continued)

OTHER PUBLICATIONS

Toth et al. (N. Toth and B. Pataki, "On Classification Confidence and Ranking Using Decision Trees," 2007 11th International Conference on Intelligent Engineering Systems, Budapest, Hungary, 2007, pp. 133-138, doi: 10.1109/INES.2007.4283686).*

(Continued)

*Primary Examiner* — Matthew D Henry
(74) *Attorney, Agent, or Firm* — MARSHALL, GERSTEIN & BORUN LLP

(57) ABSTRACT

Artificial Intelligence (AI) based methods and systems for predicting opportunities for special pricing agreements (SPA) are disclosed herein. An example method includes receiving a user input indicating a stock keeping unit (SKU) and a customer name, and accessing an SPA database to determine (i) a customer type, (ii) a customer address, and (iii) any historical SPAs corresponding to the customer. The example method further includes predicting, by utilizing a machine learning (ML) model, a set of SPA opportunities that each have a respective cost and a respective confidence interval and that satisfy a confidence interval threshold. The example method further includes determining a first SPA opportunity corresponding to a highest respective confidence interval, and a second SPA opportunity corresponding to a lowest cost of each SPA opportunity in the set of SPA opportunities; and transmitting a notification of the first and second SPA opportunities for display to a user.

17 Claims, 6 Drawing Sheets

(56) References Cited

U.S. PATENT DOCUMENTS

2020/0167869 A1    5/2020  Magdelinic
2021/0042782 A1*   2/2021  Mykhaylov ............ G06Q 40/02
2021/0304234 A1    9/2021  Marshall

OTHER PUBLICATIONS

International Application No. PCT/US2023/020310, International Search Report and Written Opinion, dated Aug. 14, 2023.

* cited by examiner

MACHINE LEARNING TECHNOLOGIES TO PREDICT OPPORTUNITIES FOR SPECIAL PRICING AGREEMENTS

FIELD OF THE DISCLOSURE

The present disclosure is generally directed to technologies for special pricing agreement (SPA) opportunity prediction and, more particularly, to machine learning (ML) technologies to predict opportunities for SPAs.

BACKGROUND

In large-scale commercial manufacturing/distribution, prices for distributed goods and products vary based on individual agreements between the distributor and the respective manufacturers. In an attempt to drive mutually profitable growth between the distributor and the manufacturer, these individual agreements often include manufacturer rebates to incentivize the distributor to meet specified sale volumes of the supplied product. Generally speaking, a manufacturer rebate is a retrospective discount or incentive on the distributor's purchase of a product offered by a manufacturer once the distributor has met a target sale volume specified in the agreement between the distributor and manufacturer. In particular, SPAs are one common type of agreement between manufacturers and distributors that include such manufacturer rebates.

However, conventionally, there is no consistent and/or accurate manner to determine an optimal pricing strategy (referenced herein as an "opportunity") for an SPA. Typically, a manufacturer or distributor attempting to devise a suitable SPA for a particular product and market segment relies on intuition and individual experience to guide the decision-making process, which results in inconsistent pricing structures between similar SPAs. This inconsistency leads to distributors and manufacturers offering and accepting SPAs with rebates/incentives that can vastly under/overestimate the financial structure required to achieve profitability for both parties. As a result, SPAs can often fail to benefit one or both parties, leading to financial burdens that are passed onto the consumer.

Correspondingly, a major point of emphasis in the commercial manufacturing/distribution industry is accurately and efficiently generating SPAs, as this can pose a substantial challenge for traditional systems. To guide a manufacturer/distributor's intuition, providing an estimated SPA typically involves manual analysis of past SPAs for similar products or customers. Such traditional manual analysis commonly overlooks and/or otherwise ignores pricing strategies that deserve significantly more consideration than others. Moreover, many commercial manufacturers and distributors generate a massive volume of such agreements each year, resulting in a significant time sink for the respective manufacturer or distributor.

Accordingly, there is a need for machine learning based technologies to predict opportunities for SPAs to thereby facilitate consistent and reliable pricing strategies.

BRIEF SUMMARY

In one aspect, an artificial intelligence (AI) based method for predicting opportunities for SPAs is executed by one or more processors. The method comprises receiving, at the one or more processors, a user input indicating a stock keeping unit (SKU) and a customer name representative of a customer; accessing, by the one or more processors, an SPA database to determine (i) a customer type associated with the customer, (ii) a customer address associated with the customer, and (iii) any historical SPAs corresponding to the customer; predicting, by the one or more processors utilizing a machine learning (ML) model, a set of SPA opportunities that each have a respective cost and a respective confidence interval and that satisfy a confidence interval threshold by inputting the SKU, the customer name, the customer address, and the historical SPAs into the ML model; determining, by the one or more processors, a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities; and transmitting, by the one or more processors, a notification of the first SPA opportunity and the second SPA opportunity for display to a user.

In another aspect, an AI based system for predicting opportunities for SPAs is described. The system comprises one or more processors and a memory storing computer-readable instructions that, when executed, cause the one or more processors to: receive a user input indicating a stock keeping unit (SKU) and a customer name representative of a customer, access an SPA database to determine (i) a customer type associated with the customer, (ii) a customer address associated with the customer, and (iii) any historical SPAs corresponding to the customer, predict, by utilizing a machine learning (ML) model, a set of SPA opportunities that each have a respective cost and a respective confidence interval and that satisfy a confidence interval threshold by inputting the SKU, the customer name, the customer address, and the historical SPAs into the ML model, determine a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities, and transmit a notification of the first SPA opportunity and the second SPA opportunity for display to a user.

In yet another aspect, a non-transitory computer readable medium containing program instructions for predicting opportunities for SPAs is described. When executed, the program instructions cause a computer to: receive a user input indicating a stock keeping unit (SKU) and a customer name representative of a customer; access an SPA database to determine (i) a customer type associated with the customer, (ii) a customer address associated with the customer, and (iii) any historical SPAs corresponding to the customer; predict, by utilizing a machine learning (ML) model, a set of SPA opportunities that each have a respective cost and a respective confidence interval and that satisfy a confidence interval threshold by inputting the SKU, the customer name, the customer address, and the historical SPAs into the ML model; determine a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities; and transmit a notification of the first SPA opportunity and the second SPA opportunity for display to a user.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
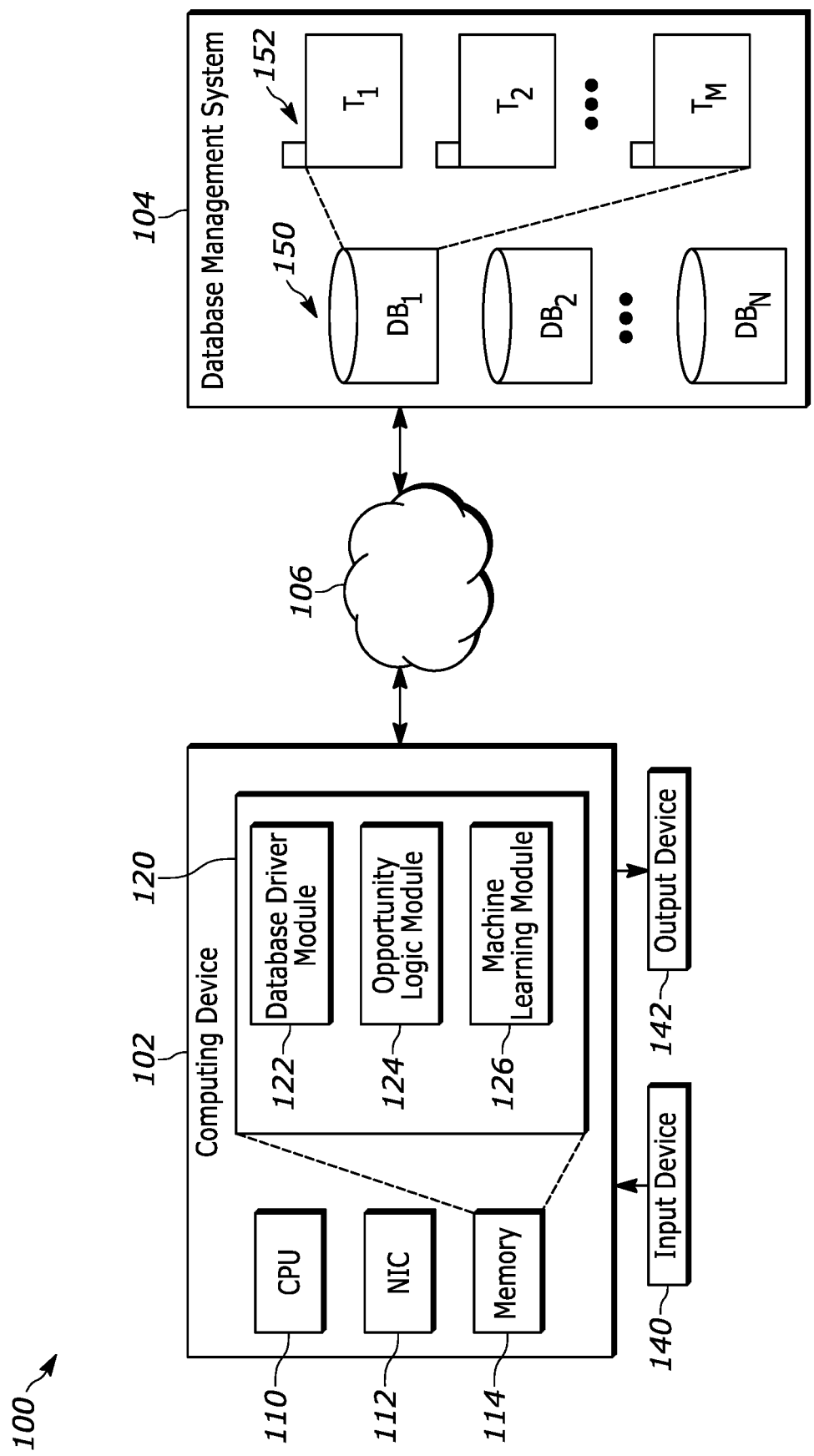
FIG. 1 depicts an exemplary computing environment in which ML technologies to predict opportunities for SPAs may be implemented, in accordance with embodiments described herein.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The embodiments described herein relate to, inter alia, automatic special pricing agreement (SPA) predictions using machine learning (ML) models. In embodiments, the present techniques include methods and systems for selectively predicting optimal SPAs for salable products on a customer-by-customer basis. Specifically, the present techniques enable customer/product-specific SPA predictions by applying a unique ML model to stock keeping unit (SKU) numbers, customer names, customer addresses, and historical SPAs. The present techniques differ from traditional SPA prediction techniques at least in that they significantly streamline the prediction process, such that the time required to perform SPA predictions, as well as the processing resources and memory resources required are greatly reduced.

As mentioned, commercial goods manufacturers and distributors typically generate SPAs using intuition and past experience to gauge appropriate levels of cost for a particular product and market segment. Generally, generating a predicted pricing structure for an SPA involves reviewing the product details and customer information to determine prices that have previously resulted in an SPA between a manufacturer and distributor, under which product sales to retailers/consumers were completed. Each prior SPA may be categorized and recorded in an internal (or external) database that may include reams of data, much of which may have been processed years ago. Specifically, conventional techniques involve scanning or searching entire prior SPA databases to identify entries featuring similar products/customers.

Problematically, scanning or searching such large databases may take a long time as the size of each database may act as a processing bottleneck, which manual evaluation is completely inadequate to alleviate. Moreover, these evaluations may require moving all or portion of the recorded SPAs to working memory, which typically includes far less storage capacity than long-term memory (e.g., the large databases). Consequently, the working memory may be unable to include all relevant SPA entries during a single transfer of data from the long-term storage databases. The user may then perform another search of the large databases and transfer another set of SPA entries to working memory for further processing. In all, these conventional techniques experience multiple processing bottlenecks causing the SPA pricing prediction process to last an excruciatingly long time.

To further complicate matters, conventional techniques create an unsavory user interactive experience. Users may receive large volumes of data that are unsorted, outdated, and/or otherwise irrelevant. For example, conventional techniques may search an SPA database to retrieve all SPA entries related to a particular product, such that the output includes all product SPAs since the inception of the SPA database. Due to the market fluctuations and other forces causing pricing schemes to change, such an expansive look at the SPA history of the product may be largely irrelevant to a current pricing strategy for that product. When a user receives this data, they may be unable to correctly or meaningfully interpret the mass of information presented. Similarly, conventional techniques do not perform automatic analysis of a feasible pricing strategy upon retrieval of the SPA data. Consequently, conventional techniques create a nearly unusable SPA pricing prediction experience for users because they may cause a user to sort through and analyze mass quantities of unintelligible data.

The present techniques are useful for alleviating these processing bottlenecks and vastly improving the usability of the SPA pricing prediction experience. Namely, the present techniques significantly reduce the processing and memory resources required to perform SPA pricing prediction by utilizing ML techniques that are applied to the SPA data, as well as product and customer data. Moreover, the present techniques automatically analyze, interpret, and sort the results of searching and analyzing the SPA databases to provide a user with readily usable and easily interpretable SPA pricing prediction data (e.g., "opportunities").

In general, the present techniques facilitate users following SPA pricing prediction best practices through an enhanced processing environment and an improved user interface.

Exemplary Computing Environment

FIG. 1 depicts an exemplary computing environment 100 in which the techniques disclosed herein may be implemented, according to an embodiment. The environment 100 includes a client computing device 102, a database management system (DBMS) 104, and a network 106. Some embodiments may include a plurality of client computing devices 102 and/or a plurality of DBMSs 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the DBMS 104, or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules 120, including a database driver module 122, an opportunity logic module 124, and a machine learning module 126

The client computing device 102 further includes an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the DBMS 104, etc.).

The one or more modules 120 implement specific functionality. For example, in an embodiment, the database driver module 122 includes computer-executable instructions that, when executed, cause a computer to access one or more electronic databases. For example, the database driver module 122 may include a library of client bindings for accessing a structured query language (SQL) database (e.g., a MySQL database, an Oracle database, etc.) or another type of database (e.g., a not only SQL (NoSQL) database). A non-limiting list of NoSQL electronic databases that may be accessed by the database driver 122 bindings includes: Apache Cassandra, Apache CouchDB, Bigtable, MongoDB, and Redis. The electronic databases accessed by the bindings in the database driver 122 may reside in the client computing device 102, the DBMS 104, and/or another location accessible by the network 106. For example, the database driver 122 may access an electronic database via a socket, a persistent network connection, or any other suitable means. In some cases, an electronic database may reside entirely in the memory 114 (i.e., an in-memory database). The database driver 122 may load one or more databases/tables into the in-memory database. Other modules in the memory 114 may use the database driver module 122 to access one or more electronic databases. For example, the opportunity logic module 124 may access the database driver 122 to retrieve data from the DBMS 104.

The opportunity logic module 124 includes instructions for filtering and analyzing SPA data sets to facilitate opportunity predictions (e.g., SPA pricing predictions). Generally, the opportunity logic module 124 retrieves SPA data from SPA databases (e.g., DBMS 104) and applies a decision tree to determine an opportunity for a particular product and customer. The opportunity logic module 124 may retrieve the SPA data from the SPA databases via the database driver module 122. For example, the opportunity logic module 124 may recover an SPA database entry for a product that was provided to a customer as part of an SPA a month prior to the current date. The opportunity logic module 124 may then apply the decision tree to the recovered SPA database entry based on the SKU number of the current product, customer name, customer address, historical SPAs associated with the customer, and/or any other suitable data.

As an example, the opportunity logic module 124 may receive an input from a user that includes a first SKU number, a first customer name, and/or a first customer address. The opportunity logic module 124 may receive the input from the user, and may access the SPA databases (e.g., DBMS 104) to retrieve a first customer type (e.g., manufacturer, distributor, etc.), a first customer address (if not provided as part of the user input), and/or a first set of historical SPAs that are associated with the customer, the product, and/or both. The opportunity logic module 124 may then analyze the first SKU number, the first customer name, the first customer address, the first customer type, and/or the first set of historical SPAs in accordance with a decision tree that filters through historical SPAs and combinations of pricing structures in order to determine one or more opportunity predictions that corresponds to the particular product represented by the first SKU number and the customer represented by the first customer name. For example, a first filter may eliminate and/or re-prioritize historical SPAs that are not associated with the customer indicated by the first customer name, and another filter may remove and/or re-prioritize any historical SPAs from consideration that are not directed to the product indicated by the first SKU number.

Regardless, the one or more opportunity predictions may include pricing structures corresponding to the product and customer indicated in the user input, such as costs to the distributor for purchase of predetermined quantities of the products before and/or after manufacturer rebates. More generally, the one or more opportunity predictions may include a first SPA opportunity that has a highest respective confidence interval relative to the respective confidence interval of each SPA opportunity of the one or more SPA opportunities, and a second SPA opportunity that corresponds to a lowest cost of the respective cost of each SPA opportunity of the one or more SPA opportunities. Thus, a user may choose the first opportunity because the highest respective confidence interval corresponds to the lowest predicted risk of failure (e.g., no agreement by the other entity), such that a user may proceed with the first opportunity in an attempt to secure an agreement with a particular manufacturer/distributor. Alternatively, the user may choose the second opportunity in an attempt to receive the most profitable financial structure for the user, but which may have a higher risk of failure (e.g., no agreement by the other entity) than the first opportunity when considered by the manufacturer/distributor. In either case, a user may analyze the opportunity predictions output by the opportunity logic module 124 to determine which opportunity prediction should be forwarded to the customer as a proposed SPA.

The machine learning module 126 includes computer-executable instructions for training and operating one or more machine learning model. In general, the machine learning module 126 may train one or more machine learning (ML) models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples.

Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction. In embodiments, a Bayesian model may be used to train the ML model.

In embodiments, the one or more ML models may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

In general, the ML model generated and trained by the ML module 126 may include the decision tree included as part of the opportunity logic module 124. As mentioned, the ML module may utilize reinforcement learning to train the ML model, and in particular, the ML module 126 may utilize outputs from the decision tree of the opportunity logic module 124 to train the ML model. Continuing the above example, the ML module 126 may input the first SKU number, the first customer name, the first customer address, and/or the first historical SPA data input into the ML model that was input into the opportunity logic module 124 when generating the two first SPA opportunities by the decision tree. The ML module 126 may receive the output SPA opportunities from the ML model, and may compare these output SPA opportunities to the two first SPA opportunities generated by the opportunity logic module 124. Based on the differences/similarities between the two sets of SPA opportunities, the ML module 126 may update various weights/parameters of the ML model to more accurately predict relevant SPA opportunities during future iterations.

In any event, the DBMS 104 includes a plurality of databases 150, including a first database DB1 through database DBn, wherein n may be any positive integer. Each of the plurality of databases 150 includes a plurality of tables 152 from T1 through Tm, wherein m may be any positive integer. In particular, each of the databases 150 may correspond to a directory/file, and each of the tables 152 may correspond to a file. As the computing device 102 generates or otherwise provides data across the network 106 to the DBMS 104, that data may be stored in one or more files of the databases 150 and/or tables 152. For example, the opportunity logic module 124 may generate SPA data corresponding to one or more goods/products for sale and/or customers that is transmitted or otherwise stored on the DBMS 104 in file of a database 150 and/or table 152. The opportunity logic module 124 may also retrieve SPA data from the DBMS 104 via the database driver module 122. The SPA data may represent SPA pricing prediction values generated by the opportunity logic module 124 and/or the ML module 126 and provided to a customer (e.g., manufacturer, distributor) as an offer for production/distribution of a good/product based on certain rebates/incentives for specified sale quantities of the underlying good/product. The SPA data may also include a record of sales executed by the manufacturer/distributor to consumers under the SPA, including related costs of the goods/products for the distributor.

In particular, a first database $DB_1$ may include historical transaction data corresponding to active and/or otherwise executed SPAs, and a second database $DB_2$ may include relationship pricing system (RPS) results corresponding to open SPAs that do not have any associated product sales. Generally, the RPS results in $DB_2$ may correspond to SPAs, under which, no product sales to/from a manufacturer, distributor, retailer, and/or consumer occurred. Moreover, the first database $DB_1$, the second database $DB_2$, and/or any other database in the DBMS 104 may be updated in real-time as sales occur under the SPAs included in the DBMS 104. For example, the first database $DB_1$ may include sales prices, costs, sales quantities, obtained rebates, and/or other data associated with completed sales of products under an active and/or otherwise executed SPA. The second database $DB_2$ may include projected/predicted sales prices, costs, quantities, potential rebates, and/or other data that is indicated in open SPAs which do not have any associated product sales. Further, in this example, each of the tables $T_1$, $T_2$, $T_M$ may correspond to individual SPAs and may include all sales executed under the respective SPAs.

Moreover, the DBMS 104 provides multiplexed access to the databases 150 and the tables 152. The DBMS 104 may be a collection of any tabular data. For example, the DBMS 104 may be implemented as a relational database management (RDBMS) such as MySQL, Oracle, etc. The DBMS may be a set of comma-separated (CSV) values, Microsoft Excel spreadsheets, etc. The DBMS 104 may be implemented in one or more computing devices (e.g., using one or more devices such as the client computing device 102). The DBMS 104 may be implemented using one or more suitable cloud computing service (e.g., using a virtual server, or a hosted virtual database instance that provides access via database bindings but does not provide operating system level access). The server(s) implementing the DBMS 104 may include one or more processor, a NIC, a memory, etc. Additionally, the computing device 102 may access any suitable storage resource (e.g., Internet websites, etc.) in order to obtain SPA data corresponding to a particular customer and/or a particular product, such as by scraping customer websites to extract relevant pricing data.

Exemplary Architecture Logic Flow

Figure 2:
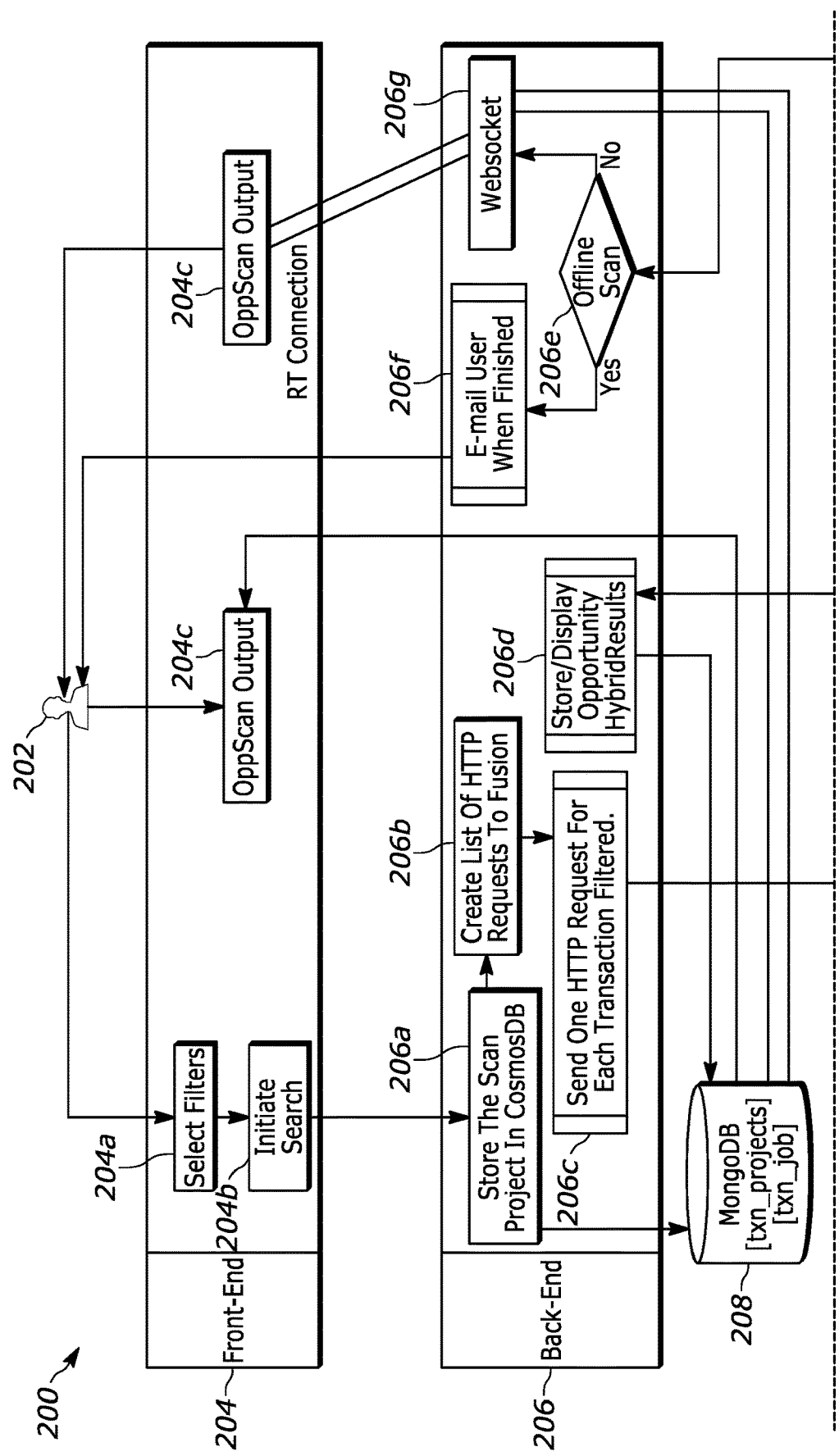
FIG. 2 depicts an exemplary architecture logic diagram representative of an example system for predicting opportunities for SPAs, in accordance with embodiments described herein.
Figure 2:
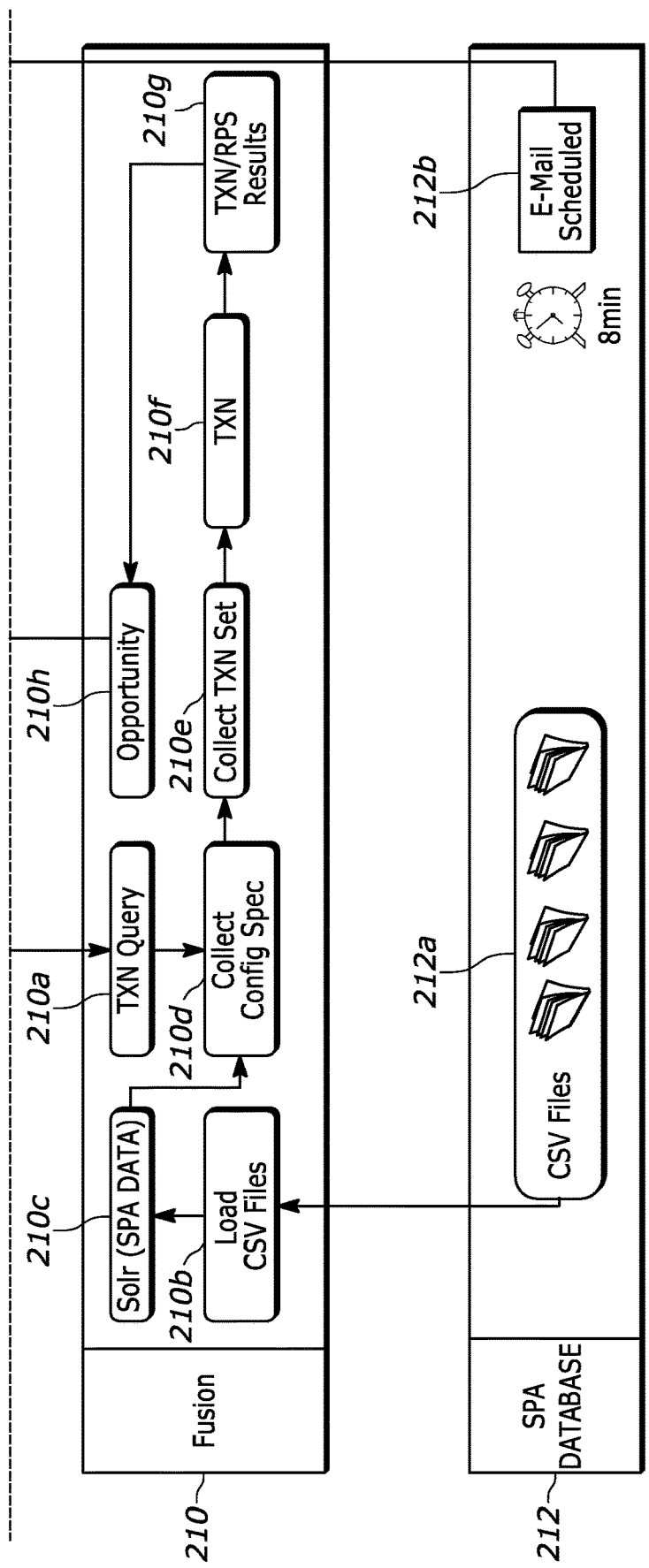

FIG. 2 depicts an exemplary architecture logic diagram 200 representative of an example system for predicting opportunities for SPAs, in accordance with embodiments described herein. The exemplary architecture logic diagram 200 generally includes a user 202 who may access a computing system configured to predict opportunities for SPAs by conducting an opportunity scan, which may include a front-end 204, a back-end 206, a query database 208, a fusion layer 210, and an SPA database 212. The user 202 may access the front-end 204 by providing a user input that includes selected filters 204a, such as a SKU number, and a customer name/address. The front-end 204 may then initiate the search 204b by transmitting the user input, including the selected filters 204a, to the back-end 206.

The back-end 206 may receive the user input, including the selected filters 204a, and may proceed to store the user input 206a into the query database 208. The back-end 206 may then proceed to create a list of requests 206b that are to be sent to the fusion layer 210, and may then send one request for each transaction filtered 206c to the fusion layer 210. For example, the user 202 may specify filters 204a for multiple transactions, such as transactions associated with multiple different customers, SKU numbers, customer addresses/geographic regions, and/or any other suitable filtering criteria. Further, in certain embodiments, each of the requests transmitted to the fusion layer 210 may be transmitted using any suitable protocol, such as hypertext transfer protocol (HTTP), and/or any other suitable protocol or combinations thereof.

Generally, the fusion layer 210 may receive the requests transmitted from the back-end 206 as one or more transactions queries 210a. Moreover, the fusion layer 210 may generally include processing components (e.g., CPU 110) and/or computer-executable instructions (e.g., opportunity logic module 124) configured to predict opportunities for display to the user 202. In any event, the fusion layer 210 may receive the transmitted requests 206c from the back-end 206 and may pull a set of SPA files 210b from the SPA files 212a stored on the SPA database 212.

The fusion layer 210 may then extract SPA data 210c from the set of SPA files 210b in order to filter the SPA data 210c based on the transaction queries 210a received from the back-end 206. As an example, the user 202 may input a user request that includes a first SKU number, a second SKU number, a first customer name, and a second customer name as selected filters 204a. The back-end 206 may transmit requests 206c to the fusion layer 210 based on each of the selected filters 204a, and the fusion layer 210 may obtain SPA files 210b from the SPA database 212 and extract SPA data 210c from the SPA files 210b that are related to each of the selected filters 204a. Thus, the SPA data 210c extracted from the SPA files 210b may include data extracted from SPAs that are related to the first SKU number, the second SKU number, the first customer name, the second customer name, and/or any other suitable data from the user input or combinations thereof.

The fusion layer 210 may then proceed to collect a configuration spec 210d based on the SPA data 210c and the transaction queries 210a in order to begin filtering the SPA data 210c based on the transaction queries 210a. The fusion layer 210 may apply the filters included in the transaction queries 210a to the SPA data 210c at 210d, and may thereby generate a set of transactions 210e that are related to the filters included in the transaction queries 210a. The fusion layer 210 may then take each individual transaction 210f and calculate a set of transaction results 210g corresponding to each individual transaction 210f. When the fusion layer 210 has calculated a set of transaction results 210g for each individual transaction 210f from the set of transactions 210e, the fusion layer 210 may determine a predicted opportunity 210h for presentation to the user 202 based on the set of transaction results 210g.

Continuing the prior example, the back-end 206 may transmit the first SKU number, the second SKU number, the first customer name, and the second customer name as part of the transaction query 210a received at the fusion layer 210, and the fusion layer 210 may proceed to extract SPA data 210c corresponding to each of the criteria included in the query 210a. The fusion layer 210 may then filter the SPA data 210c by eliminating and/or otherwise removing SPA data from the SPA data 210c at blocks 210d and 210e that does not include and/or is otherwise unrelated to any of the first SKU number, the second SKU number, the first customer name, and/or the second customer name, to determine relevant transactions 210f. The fusion layer 210 may then calculate a set of transaction results 210g for each of the relevant transactions 210f, and may determine a predicted opportunity for presentation to the user 202 that best represents an SPA opportunity related to one or more of the first SKU number, the second SKU number, the first customer name, and/or the second customer name. Of course, it should be appreciated that one or more of the selected filters 204a included in the transaction queries 210a may be related, such that the first SKU number and the first customer name, and the second SKU number and the second customer name are associated with single requests for SPA opportunities.

Generally speaking, the filtered transactions 210f may be selected from the set of transactions 210e based on any number of relevant metrics that correspond to one or more aspects of the transactions included in the set of transactions 210e. For example, the filtered transactions 210f may have been selected from the set of transactions 210e based on any of a transaction type (e.g., SPA, non-SPA), a tag (e.g., concatenation of columns related to the transaction), an invoice date, a region name, a district name, a branch number, a branch name, a customer number, a customer name, a customer type (e.g., manufacturer, distributor, etc.), a manufacturer price group code, a SKU number (e.g., a universal product code (UPC)), a product class/subclass/upper class, a transaction description, a manufacturer code, a quantity sold, a total sales value, a total cost value, a total margin value (e.g., a percentage margin calculated between the total sales value and the total cost value), a unit cost value, an outside sales name, an inside sales name, a purchasing manager name, a purchasing owner (e.g., global, regional, etc.), a data universal numbering system (DUNS) name/number, an internal sub segment value, an internal segment value, a current SPA cost per unit value, a current SPA contract authorization name, a customer number segment, a similar manufacturer, a similar product class, an SPA claimed flag, an SPA authorization name, a global account flag, a global account similar manufacturer, a line value, a unit of measure, a branch name minimum SPA cost value, a district name SPA minimum cost value, a region name SPA minimum cost value, a branch name average SPA cost value, a district name SPA average cost value, a region name SPA average cost value, a past margin value, a target unit cost, and/or any other suitable value indicated as part of a transaction of the filtered transactions or combinations thereof.

As an example, a first transaction included in the set of transactions 210e may include a total margin value that the fusion layer 210 (e.g., executing the opportunity logic module 124) may find satisfactory for inclusion as a respective transaction 210f that is further analyzed by calculating the transaction results 210g. Such a total margin value for the first transaction can be given by $$\text{Total Margin Value} = \left(1 - \left(\frac{\text{average\_cost\_extended\_total}}{\text{sell\_price\_extended\_total}}\right)\right) \quad (1)$$

where the average_cost_extended_total may correspond to the total cost value for the first transaction, and the sell_price_extended_total may correspond to the total sales value for the first transaction.

In any evet, when the fusion layer 210 determines the set of transactions 210e, the fusion layer 210 may proceed to calculate the transactions results 210g for each respective transaction 210f based on four primary factors: an SKU similarity value, a customer similarity value, a geographical similarity value, and a blanket SPA existence value related to the customer. In particular, the fusion layer 210 may evaluate each of the four primary factors independently, and then may calculate a confidence interval for each respective transaction 210f based on the values of the four primary factors for the respective transaction 210f.

As previously mentioned, each of the transactions 210f include certain values in their SPA data that may be used to filter them from the set of transactions 210e as potential opportunities, and the fusion layer 210 may utilize these certain values to calculate the four primary factor values. For example, the SKU similarity value may be determined based on the SKU number, the manufacturer price group code, the product subclass, and/or the product upper class indicated in the transaction query 210a and the respective transaction 210f.

Namely, if the SKU number for the product indicated in the transaction query 210a matches the SKU number included in a respective transaction 210f, then the fusion layer 210 may calculate the SKU similarity value as 1. If the SKU number for the product indicated in the transaction query 210a does not match the SKU number included in a respective transaction 210f, but the manufacturer price group code indicated in the transaction query 210a matches the manufacturer price group code of the respective transaction 210f, then the fusion layer 210 may calculate the SKU similarity value as 0.25. However, if the SKU number and the manufacturer price group code indicated in the transaction query 210a do not match the SKU number or the manufacturer price group code of the respective transaction 210f, then the fusion layer 210 may calculate the SKU similarity value as 0, regardless of whether or not the product subclass, product upper class, and/or any other value indicated in the transaction query 210a matches the corresponding value in the respective transaction 210f. By default, the SKU similarity value may be 0 unless the fusion layer 210 identifies a similarity between the SKU number and/or the manufacturer price group code of the transaction query 210a and the respective transaction 210f. Of course, it should be understood that the fusion layer 210 may calculate the SKU similarity value based on any suitable values, and the fusion layer 210 may calculate the SKU similarity values to be any suitable values (e.g., 0, 0.1, 0.25, 0.35, 0.45, 0.5, 0.75, 0.9, 1) based on the considered values in the transaction query 210a and the respective transaction 210f.

The customer similarity value may be determined based on the branch identification (e.g., branch number, branch name), the customer number, the DUNS number, the internal sub segment value, and/or the internal segment value indicated in the transaction query 210a and the respective transaction 210f. If the branch identification and the customer number indicated in the transaction query 210a matches the branch identification and the customer number included in a respective transaction 210f, then the fusion layer 210 may calculate the customer similarity value as 1. If the branch identification and the customer number indicated in the transaction query 210a does not match the branch identification and the customer number included in a respective transaction 210f, but the DUNS number indicated in the transaction query 210a matches the DUNS number of the respective transaction 210f, then the fusion layer 210 may calculate the customer similarity value as 0.9. Further, if the branch identification, the customer number, and the DUNS number indicated in the transaction query 210a do not match the branch identification, the customer number, or the DUNS number of the respective transaction 210f, but the internal sub segment value indicated in the transaction query 210a matches the internal sub segment value of the respective transaction 210f, then the fusion layer 210 may calculate the customer similarity value as 0.5.

Moreover, if the branch identification, the customer number, the DUNS number, and the internal sub segment value indicated in the transaction query 210a do not match the branch identification, the customer number, the DUNS number, or the internal sub segment value of the respective transaction 210f, but the internal segment value indicated in the transaction query 210a matches the internal segment value of the respective transaction 210f, then the fusion layer 210 may calculate the customer similarity value as 0.45. However, if none of the branch identification, the customer number, the DUNS number, the internal sub segment value, or the internal segment value matches the corresponding value of the respective transaction 210f, then the then the fusion layer 210 may calculate the customer similarity value as a default value of 0.1. Of course, similar to the SKU similarity value, it should be understood that the fusion layer 210 may calculate the customer similarity value based on any suitable values, and the fusion layer 210 may calculate the customer similarity values to be any suitable values (e.g., 0, 0.1, 0.25, 0.35, 0.45, 0.5, 0.75, 0.9, 1) based on the considered values in the transaction query 210a and the respective transaction 210f.

The geographical similarity value may be determined based on the branch identification, the district identification (e.g., a district name), and/or the region identification (e.g., a region name) indicated in the transaction query 210a and the respective transaction 210f. If the branch identification indicated in the transaction query 210a matches the branch identification included in a respective transaction 210f, then the fusion layer 210 may calculate the geographical similarity value as 1. If the branch identification indicated in the transaction query 210a does not match the branch identification included in a respective transaction 210f, but the district identification indicated in the transaction query 210a matches the district identification of the respective transaction 210f, then the fusion layer 210 may calculate the geographical similarity value as 0.67. If the branch identification and the district identification indicated in the transaction query 210a do not match the branch identification or the district identification of the respective transaction 210f, but the region identification indicated in the transaction query 210a matches the region identification of the respective transaction 210f then the fusion layer 210 may calculate the geographical similarity value as 0.1. However, if none of the branch identification, the district identification, or the region identification indicated in the transaction query 210a matches the branch identification, the district identification, or the region identification, of the respective transaction 210f, then the fusion layer 210 may calculate the geographical similarity value as a default value of 0. Of course, similar to the SKU similarity value and the customer similarity value, it should be understood that the fusion layer 210 may calculate the geographical similarity value based on any suitable values, and the fusion layer 210 may calculate the geographical similarity values to be any suitable values (e.g., 0, 0.1, 0.25, 0.35, 0.45, 0.5, 0.75, 0.9, 1) based on the considered values in the transaction query 210a and the respective transaction 210f.

The blanket SPA existence value may be determined based on the SPA authorization name indicated in the transaction query 210a. If the SPA authorization name indicated in the transaction query 210a matches any SPA authorization name included in the SPA files 210b or the SPA data 210c, then the fusion layer 210 may calculate the blanket SPA existence value as 1. However, if the SPA authorization name indicated in the transaction query 210a does not match any SPA authorization name included in the SPA files 210b or the SPA data 210c, then the fusion layer 210 may calculate the blanket SPA existence value as a default value of 0.75. Of course, similar to the SKU similarity value, the customer similarity value, and the geographical similarity value, it should be understood that the fusion layer 210 may calculate the blanket SPA existence value based on any suitable values, and the fusion layer 210 may calculate the blanket SPA existence values to be any suitable values (e.g., 0, 0.1, 0.25, 0.35, 0.45, 0.5, 0.75, 0.9, 1) based on the considered values in the transaction query 210a.

When the fusion layer 210 calculates each of these four similarity values for a respective transaction 210f, the fusion layer 210 may proceed to calculate a confidence interval for the respective transaction 210f. The fusion layer 210 may attribute distinct weightings for each of the four similarity values when calculating the confidence interval, such that the similarity values may each have a different impact on the overall confidence interval. In particular, the fusion layer 210 may calculate a confidence interval for each respective transaction 210f based on the values of the four primary factors for the respective transaction 210f, as given by:

$$\text{Confidence Interval} = \frac{300 \times (SKU_{similarity}) + 100 \times (Cus_{similarity}) + 100 \times (Geo_{similarity}) + 10 \times (\text{Blanket } SPA)}{510} \quad (2)$$

where $SKU_{similarity}$ is the SKU similarity value for a respective transaction 210f, $Cus_{similarity}$ is the customer similarity value for a respective transaction 210f, $Geo_{similarity}$ is the geographical similarity value for a respective transaction 210f, and Blanket SPA is the blanket SPA existence value for a respective transaction 210f. Thus, the fusion layer 210 may calculate the confidence interval for a respective transaction 210f as a weighted average of the four similarity values, as indicated by equation (2). However, it should be appreciated that the confidence interval may be calculated using any suitable formulation.

When the fusion layer 210 calculates the confidence interval for a respective transaction 210f, the fusion layer 210 may proceed to determine one or more opportunity predictions 210h for presentation to a user. As previously mentioned, the opportunity predictions 210h may include pricing structures corresponding to the product and customer indicated in the transaction query 210a, such as costs to the distributor for purchase of predetermined quantities of the products before and/or after manufacturer rebates. More generally, the one or more opportunity predictions 210h may include a first opportunity that has a highest respective confidence interval relative to the respective confidence interval of each SPA opportunity of the one or more SPA opportunities, and a second SPA opportunity that corresponds to a lowest cost of the respective cost of each SPA opportunity of the one or more SPA opportunities.

The fusion layer 210 may then transmit these opportunity predictions 210h back to the back-end 206, which in turn, may store 206d the opportunity predictions 210h in the query database 208. The query database 208 may then transmit the opportunity predictions 210h to a websocket 206g on the back-end 206 for transmission to the user 202. The websocket 206g may then transmit the results to the front-end 204, wherein the opportunity predictions 210h are presented to the user 202 as part of an opportunity scan output 204c, which may also include graphical user interface components that are configured to enable the user 202 to view the opportunity predictions 210h with relevant metrics (e.g., confidence interval, cost, etc.). As part of the opportunity scan output 204c, the user 202 may select one or more opportunity predictions for transmission to a customer, in order to offer a bid for an SPA based on the selected opportunity prediction.

As the opportunity predictions 210h are stored on the query database 208, the user 202 may query the query database 208 to retrieve the opportunity scan output 204c for a predetermined period of time following the user 202 inputting the selected filters 204a to initiate the opportunity scan. Additionally, or alternatively, the user 202 may schedule an opportunity scan to execute while the user 202 is offline, such that the back-end/front-end may not immediately notify the user 202 via the websocket 206g of the opportunity scan output 204c. In these instances, the SPA database 212 may utilize a scheduling module 212b to schedule notifications for transmission to the user 202 at a predetermined frequency, a predetermined date, a predetermined time, and/or during any other suitable period. For example, the scheduling module 212b may send an email to the user 202 in order to notify the user 202 about the opportunity scan output 204c when the user 202 accesses the email.

When the scheduling module 212b transmits the email to the user 202, the back-end 206 may determine whether or not the opportunity scan was performed while the user 202 is offline. If the back-end 206 determines that the user 202 is offline while the opportunity scan is performed and/or completed (YES branch of block 206e), the back-end 206 may email the user 202 when the opportunity scan is completed (block 206f). In this manner, the user 202 may access the opportunity scan output 204c at any time when the user 202 accesses the email. However, if the back-end 206 determines that the user 202 is online while the opportunity scan is performed and/or completed (NO branch of block 206e), the back-end 206 may proceed with providing the user 202 a notification through the websocket 206g, so that the user 202 may be notified while the user 202 is online.

Example Methods for Predicting Opportunities for SPAs

Figure 3:
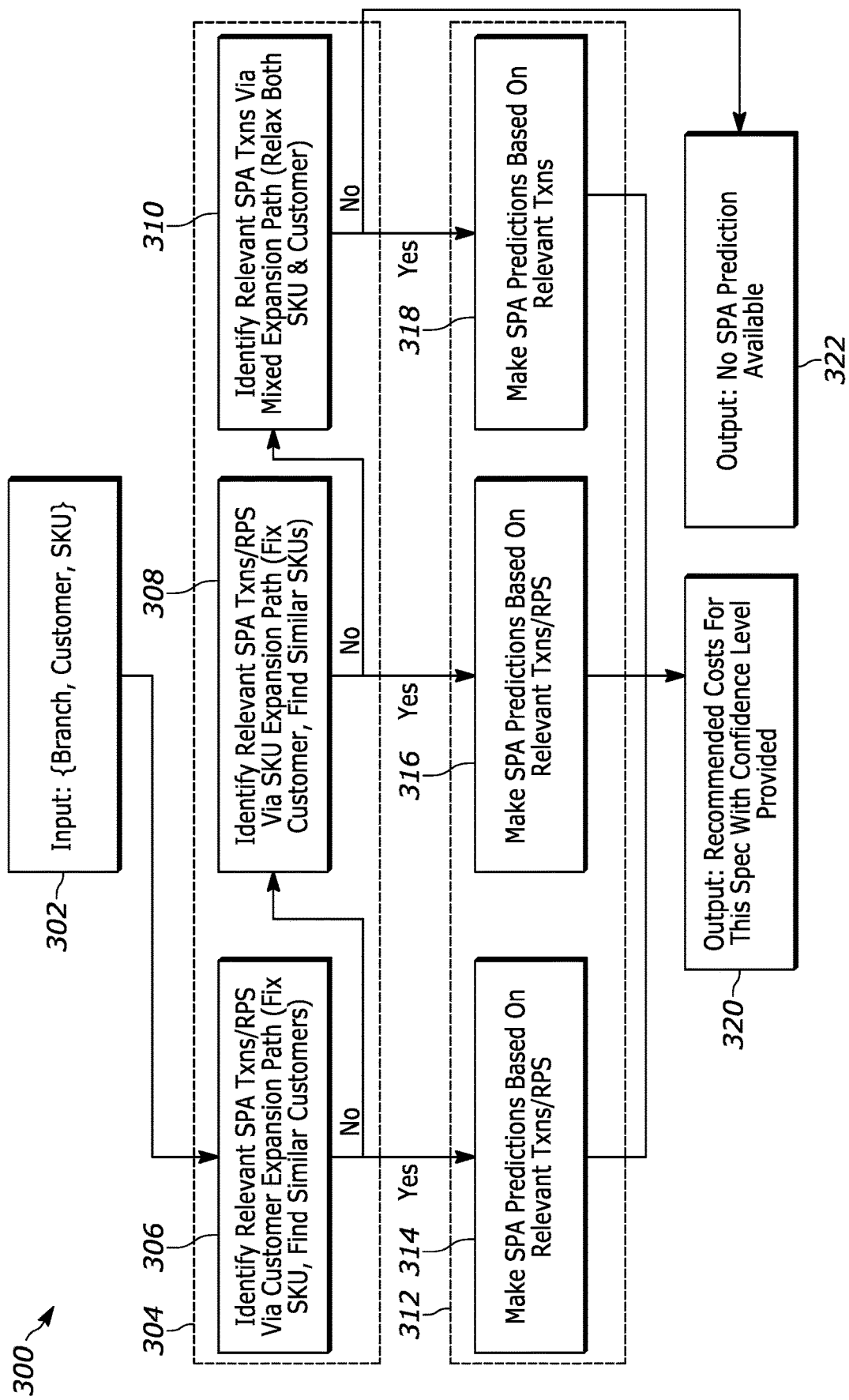
FIG. 3 is a flow diagram of an example method for predicting opportunities for SPAs, in accordance with embodiments described herein.

While FIG. 2 provides a general overview of the processing architecture logic flow in order to perform an opportunity scan, FIG. 3 describes an exemplary method for predicting SPA opportunities. In particular, FIG. 3 is a flow diagram of an example method 300 for predicting opportunities for SPAs, in accordance with embodiments described herein. It should be understood that any of the processing actions described herein in reference to the example method 300 may be performed by any of the processing components described herein (e.g., CPU 110, opportunity logic module 124, machine learning module 126, front-end 204, back-end 206, query database 208, fusion layer 210, SPA database 212, etc.).

Moreover, the processor(s) performing each of the set of scanning paths 304 described herein in reference to FIG. 3 may access SPA data stored in any suitable database in order to execute the respective scanning paths 306, 308, 310. For example, the processor(s) may initially access a first database (e.g., $DB_1$) that includes historical transaction data corresponding to active and/or otherwise executed SPAs when performing any of the set of scanning paths 304, and may then access a second database (e.g., $DB_2$) that includes RPS results corresponding to open SPAs that do not have any associated product sales. Generally speaking, the RPS results may include a vast amount of data relative to the historical transaction data, such that scanning the second database may require significantly more processing resources, dedicated run-time memory, and overall processing time than scanning the first database. Thus, the instructions executed by the processor(s) in order to perform the set of scanning paths 304 may cause the processor(s) to prioritize the historical transaction data first when scanning for SPA opportunities as part of any individual scanning path (306, 308, 310), and to access the RPS results after no SPA opportunity is generated from analyzing the historical transaction data as part of any individual scanning path (306, 308, 310). Of course, in certain aspects, the processor(s) may access both data sets simultaneously during the execution of any/all scanning paths (306, 308, 310), the processor(s) may access the RPS results first before analyzing the historical transaction data during the execution of any/all scanning paths (306, 308, 310), and/or the processor(s) may generally access either data set in any suitable order or combination thereof.

In any event, the example method 300 includes receiving user input, that may include a branch identification, a customer identification, and a SKU number (block 302). When the user input is received, the method 300 further includes by proceeding through a set of scanning paths 304, including a similar customer scan path 306 (also referenced herein as a "C-path scan"), a similar product scan path 308 (also referenced herein as an "S-path scan"), and a similar customer and product scan path 310 (also referenced herein as an "M-paths scan"). Generally speaking, the processor(s) receiving the user input and executing instructions to perform any of the set of scanning paths 304 may perform the set of scanning paths 304 in a particular order, due to the typical correspondence between the strength of the confidence intervals corresponding to the results of each scanning path. Namely, the processor(s) may execute the C-path scan 306 first, the S-path scan 308 second, and the M-path scan 310 third, and if the processor(s) identify at least one SPA opportunity after the execution of any of the individual scanning paths 306, 308, 310, then the processor(s) may not continue to execute the remaining scanning paths.

As an example, the processor(s) receiving the user input may initially proceed to perform an opportunity scan, as described in reference to FIG. 2, by executing the C-path scan 306. In order to execute the C-path scan 306, the processor(s) may hold the SKU number fixed during the scan, and may attempt to identify SPA opportunities that have similar customer names/numbers. In this manner, the C-path scan 306 may yield SPA opportunities that have pricing structures based on identical products to the product(s) identified in the user input, and as a result, may have the highest respective confidence intervals of opportunities identified along any of the set of scanning paths 304 as identical products included as part of a prior successful pricing strategy are generally the strongest indicator of a current successful pricing strategy. As previously mentioned, the confidence interval may generally correspond to a predicted chance of success, and by extension, a predicted risk of failure, of the proposed SPA opportunity (e.g., rejection/agreement by the other entity) when proposed to another entity (e.g., manufacturer, distributor, etc.). Thus, SPA opportunities generated from the C-path scan 306 may typically have the highest chance of success (and/or the lowest risk of failure), such that a user may normally desire to proceed with an SPA opportunity generated from the C-path scan 306. Regardless, if the processor(s) generate an SPA opportunity as a result of executing the C-path scan 306 (YES branch of block 306), then the processor(s) may proceed to execute the S-path calculations 314 of the set of calculations 312 without executing either the S-path scan 308 or the M-path scan 310, in order to reduce demand on processing resources and decrease the overall time required to produce a viable SPA opportunity.

However, if the processor(s) do not generate any SPA opportunities as a result of executing the C-path scan 306 (NO branch of block 306), then the processor(s) may proceed to execute the S-path scan 308. In order to execute the S-path scan 308, the processor(s) may hold the customer name/number fixed during the scan, and may attempt to identify SPA opportunities that have similar SKU numbers. In this manner, the S-path scan 308 may yield SPA opportunities that have pricing structures based on identical customers to the customer(s) identified in the user input, and as a result, may have relatively high respective confidence intervals relative to the opportunities identified along the M-path scan 310. Customers in similar industries, customers that produce/provide similar products, customers that operate in similar geographical locations, and/or customers that otherwise share relevant characteristics may generally engage in similar pricing structures/SPAs in order to benefit from such arrangements/agreements. Thus, the processor(s) may generate SPA opportunities from the S-path scan 308 that typically have a high chance of success (and/or a low risk of failure), such that a user may desire to proceed with an SPA opportunity generated from the S-path scan 308 with greater confidence than an SPA opportunity generated from, for example, the M-path scan 310. If the processor(s) generate an SPA opportunity as a result of executing the S-path scan 308 (YES branch of block 308), then the processor(s) may proceed to execute the S-path calculations 316 of the set of calculations 312 without executing the M-path scan 310, in order to reduce demand on processing resources and decrease the overall time required to produce a viable SPA opportunity.

If the processor(s) do not generate any SPA opportunities as a result of executing the S-path scan 308 (NO branch of block 308), then the processor(s) may proceed to execute the M-path scan 310. In order to execute the M-path scan 310, the processor(s) may relax the constraints on both the SKU number and the customer name/number during the scan, and may attempt to identify SPA opportunities that have similar SKU numbers and/or similar customer names/numbers. In this manner, the M-path scan 310 may yield SPA opportunities that have pricing structures based on similar products to the products identified in the user input and similar customers to the customer(s) identified in the user input, and as a result, may have acceptable confidence intervals for a user to consider transmitting the SPA opportunities to customers. If the processor(s) generate an SPA opportunity as a result of executing the M-path scan 310 (YES branch of block 310), then the processor(s) may proceed to execute the M-path calculations 318 of the set of calculations 312. Alternatively, if the processor(s) do not generate an SPA opportunity as a result of executing the M-path scan 310 (NO branch of block 310), then the processor(s) may proceed to provide the output 322 indicating to a user that no SPAs were generated as a result of the set of scanning paths 304.

When the processor(s) have executed as many of the set of scanning paths 304 as necessary to yield an SPA opportunity, the processor(s) may proceed to execute the set of calculations 312 based on which scanning path generated an SPA opportunity. For example, if the C-path scan 306 generates an SPA opportunity, then the processor(s) may proceed to execute the C-path calculation 314 (YES branch of block 306). The processor(s) may execute the C-path calculation 314 by calculating confidence intervals for each SPA opportunity generated as a result of the C-path scan 306, for example, in accordance with equation (2). Similarly, if the S-path scan 308 or the M-path scan 310 generates an SPA opportunity, then the processor(s) may proceed to execute the S-path calculation 316 (YES branch of block 308) or the M-path calculation 318 (YES branch of block 310), respectively. The processor(s) may execute the S-path calculation 316 or the M-path calculation 318 by calculating confidence intervals for each SPA opportunity generated as a result of the S-path scan 308 or the M-path scan 310, for example, in accordance with equation (2). However, in certain aspects, the processor(s) may execute more than one of the set of calculations 312 in response to a single user input.

When the processor(s) have executed one of the set of calculations 312, the processor(s) may proceed to generate the output 320 for viewing by a user. The output 320 may generally include recommended costs, outlined in an SPA opportunity, along with an associated confidence interval of the SPA opportunity. As part of the output 320, the processor(s) may provide multiple SPA opportunities for viewing by the user. As previously mentioned, the SPA opportunities may include a first SPA opportunity that has a highest respective confidence interval relative to the respective confidence interval of each SPA opportunity of the multiple SPA opportunities, and a second SPA opportunity that corresponds to a lowest cost of the respective cost of each SPA opportunity of the multiple SPA opportunities.

Thus, a user may choose the first opportunity because the highest respective confidence interval corresponds to the highest predicted chance of success (e.g., agreement by the other entity), and by extension the lowest predicted risk of failure, such that a user may proceed with the first opportunity in an attempt to secure an agreement with a particular manufacturer/distributor. Alternatively, the user may choose the second opportunity in an attempt to receive the most profitable financial structure for the user, but which may have a higher risk of failure (e.g., no agreement by the other entity) than the first opportunity when considered by the manufacturer/distributor.

Regardless, it is to be understood that the actions described in reference to FIG. 3 may be performed in any suitable order and any suitable number of times to achieve a desired result. For example, in certain aspects, the processor(s) may identify an SPA opportunity as a result of executing the C-path scan 306 and/or the S-path scan 308 and may proceed to execute any of the subsequent scans 308, 310 before or after executing any of the set of calculations 312, and/or before or after receiving user input corresponding to any of the SPA opportunity outputs 320 generated from either the C-path scan 306 or the S-path scan 308.

Figure 4:
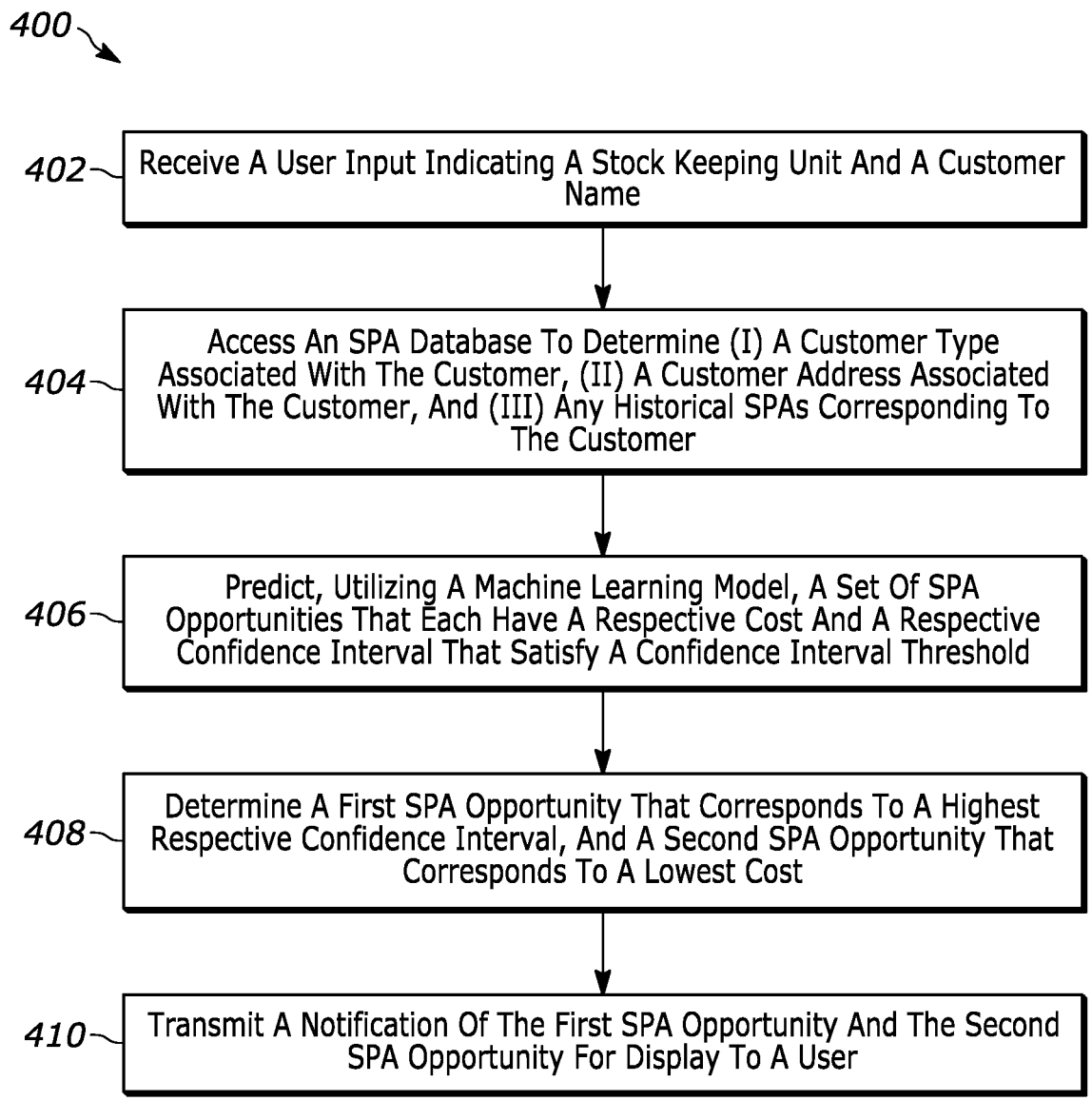
FIG. 4 is another flow diagram of an example method for predicting opportunities for SPAs, in accordance with embodiments described herein.

FIG. 4 is another flow diagram of an example method 400 for predicting opportunities for SPAs, in accordance with embodiments described herein. The method 400 includes receiving, at one or more processors, a user input indicating a stock keeping unit (SKU) and a customer name representative of a customer (block 402). The method 400 further includes accessing, by the one or more processors, an SPA database (e.g., SPA database 212) to determine (i) a customer type associated with the customer, (ii) a customer address associated with the customer, and (iii) any historical SPAs corresponding to the customer (block 404).

In certain aspects, the SPA database includes (i) a set of historical transactions corresponding to executed sales that include a sale price and cost, and (ii) a set of open contracts corresponding to non-executed sales that include a hypothetical sale price and a hypothetical cost. For example, the SPA database may include a first database (e.g., $DB_1$) that includes historical transaction data corresponding to active and/or otherwise executed SPAs, and a second database (e.g., $DB_2$) that includes relationship pricing system (RPS) results corresponding to open SPAs that do not have any associated product sales.

The method 400 may also include predicting, by the one or more processors utilizing a machine learning (ML) model (e.g., trained by the ML module 126), a set of SPA opportunities that each have a respective cost and a respective confidence interval and that satisfy a confidence interval threshold by inputting the SKU, the customer name, the customer address, and the historical SPAs into the ML model (block 406). Generally, the confidence interval threshold may correspond to a minimum confidence interval a respective SPA opportunity must have in order to be output for viewing by a user, and may be any suitable value, such as 40% confidence that the pricing structure of the SPA opportunity will be sufficient to achieve an agreement between the user (e.g., the entity represented by the user) and another entity. Thus, as an example, an SPA opportunity with a respective confidence interval of 65% would satisfy the confidence interval threshold (40%), and may be transmitted by the processor(s) to the user for viewing/consideration. However, it should be understood that the confidence interval threshold may be any suitable value, and may be defined in any suitable manner, such as a percentage, ratio, and/or any other suitable value or combinations thereof.

In certain aspects, the method 400 may further include training, by the one or more processors (e.g. executing the ML module 126), the ML model using a set of training SKU data, a set of training customer type data, a set of training customer address data, a set of training historical SPAs, and a set of sales data to output a set of training SPA opportunities.

In some aspects, the method 400 may further include checking, by the one or more processors, the SPA database in real-time at a predetermined frequency to determine whether or not the SPA database includes a new entry. Responsive to determining that the SPA database includes the new entry, the method 400 may further include updating, by the one or more processors, the ML model based on the new entry. Moreover, in these aspects, the method 400 may further include predicting, by the one or more processors utilizing the ML model, a new set of SPA opportunities that each have a respective new cost and a respective new confidence interval based on the SKU, the customer type, the customer address, and the historical SPAs.

In certain aspects, the method 400 may further include predicting, by the one or more processors executing the ML model, the set of SPA opportunities by inputting the SKU, the customer name, the customer address, and the historical SPAs into the ML model, and a similar customer value that enables the ML model to analyze similar customers to the customer based on the customer type (e.g., the C-path scan 306). Further in these aspects, the method 400 may include determining, by the one or more processors, that each SPA opportunity of the set of SPA opportunities fails to satisfy the confidence interval threshold. If the processor(s) determine that each SPA opportunity fails to satisfy the confidence interval threshold, then the one or more processors executing the ML model may predict a subsequent set of SPA opportunities by inputting the SKU, the customer name, the customer address, and the historical SPAs into the ML model, and a similar SKU value that enables the ML model to analyze similar SKUs to the SKU (e.g., the S-path scan 308). However, if the one or more processors determine, by the one or more processors, that each SPA opportunity of the subsequent set of SPA opportunities fails to satisfy the confidence interval threshold, the one or more processors executing the ML model may predict a second subsequent set of SPA opportunities by inputting the SKU, the customer name, the customer address, and the historical SPAs into the ML model, the similar customer value, and the similar SKU value (e.g., the M-path scan 310).

The method 400 may further include determining, by the one or more processors, a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities (block 408). The method 400 may further include transmitting, by the one or more processors, a notification of the first SPA opportunity and the second SPA opportunity for display to a user (block 410).

Figure 5:
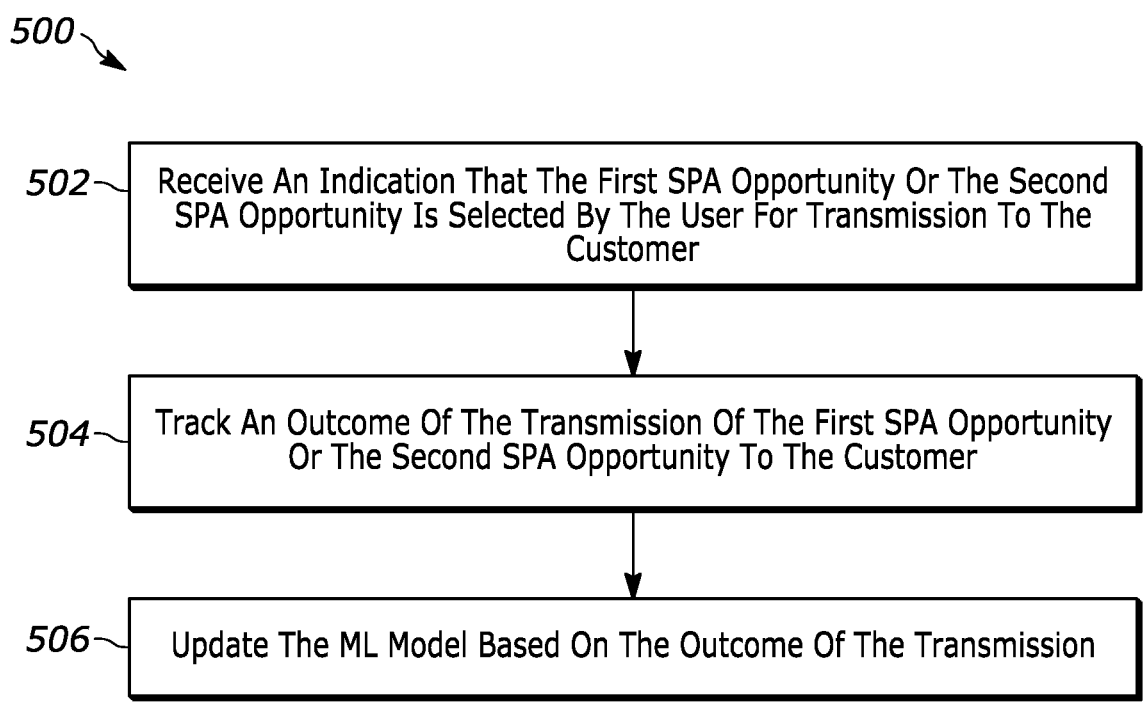
FIG. 5 is a flow diagram of an example method for updating a ML model configured to predict opportunities for SPAs based on tracked outcomes of predicted SPA opportunities, in accordance with embodiments described herein.

However, in certain aspects, the user may select a particular SPA opportunity, and the results of those selected SPA opportunities may be used to train the ML model to produce better SPA opportunity predictions in future iterations. To illustrate, FIG. 5 is a flow diagram of an example method 500 for updating a ML model configured to predict opportunities for SPAs based on tracked outcomes of predicted SPA opportunities, in accordance with embodiments described herein.

The method 500 includes receiving, at the one or more processors, an indication that the first SPA opportunity or the second SPA opportunity is selected by the user for transmission to the customer (block 502). For example, the user may select the first SPA opportunity for transmission to the customer in an attempt to secure an agreement with the customer under the terms specified in the first SPA opportunity. When the customer receives the first SPA opportunity, the customer may accept or reject the first SPA opportunity, offer alternative financial structures, and/or other responses or combinations thereof. In order to utilize any of these responses from the customer, the method 500 may further include tracking, by the one or more processors, an outcome of the transmission of the first SPA opportunity or the second SPA opportunity to the customer. For example, the user may input any received responses from the customer into the computing device 102, which may utilize the opportunity logic module 124 and/or the machine learning module 126 to analyze the received responses and update the ML model.

Accordingly, the method 500 may further include updating, by the one or more processors, the ML model based on the outcome of the transmission. If the SPA opportunity transmitted by the user to the customer is accepted by the customer, the ML module 126 may train the ML model using the customer's acceptance (e.g., the outcome of the transmission) as input to predict more SPA opportunities similar to the transmitted SPA opportunity. However, if the transmitted SPA opportunity is rejected by the customer, the ML module 126 may train the ML model using the customer's rejection (e.g., the outcome of the transmission) as input to predict fewer SPA opportunities similar to the transmitted SPA opportunity.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. An artificial intelligence (AI) based method for predicting opportunities for special pricing agreements (SPA), comprising:
   receiving, at one or more processors, a user input indicating a stock keeping unit (SKU), a customer name representative of a customer, and one or more filters corresponding to the SKU or the customer name;
   searching, by the one or more processors, an SPA database to retrieve a set of SPA data associated with the SKU and the customer name, the set of SPA data including: (i) a customer type associated with the customer, (ii) a customer address associated with the customer, and (iii) any historical SPAs corresponding to the customer;
   filtering, by the one or more processors executing a machine learning (ML) model configured to prioritize SPA data within the set of SPA data based on the one or more filters by applying a decision tree, the set of SPA data to generate a filtered set of SPA data, wherein the decision tree is trained to output the filtered set of SPA data by:
   inputting, into the decision tree, feature vectors representing training SPA data and labels classifying the training SPA data,
   determining, by the decision tree, classifications corresponding to the training SPA data, and
   adjusting weights or parameters of the decision tree based on the classifications and the labels;
   predicting, by the one or more processors applying the ML model to the filtered set of SPA data, a set of SPA opportunities that each have a respective cost and a respective confidence interval and that satisfy a confidence interval threshold by inputting the filtered set of SPA data into the ML model;
   determining, by the one or more processors, a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities;
   transmitting, by the one or more processors, a notification of the first SPA opportunity and the second SPA opportunity for display to the customer;
   tracking, by the one or more processors, an outcome of a transmission of the first SPA opportunity or the second SPA opportunity to the customer; and
   retraining, by the one or more processors, the ML model based on the outcome indicating an acceptance or a rejection of the first SPA opportunity or the second SPA opportunity by the customer.

2. The AI based method of claim 1, further comprising:
   receiving, at the one or more processors, an indication that the first SPA opportunity or the second SPA opportunity is selected by the user for the transmission to the customer; and
   tracking, by the one or more processors, the outcome of the transmission of the first SPA opportunity or the second SPA opportunity to the customer.

3. The AI based method of claim 1, wherein the SPA database includes (i) a set of historical transactions corresponding to executed sales that include a sale price and cost, and (ii) a set of open contracts corresponding to non-executed sales that include a hypothetical sale price and a hypothetical cost.

4. The AI based method of claim 1, further comprising:
   checking, by the one or more processors, the SPA database in real-time at a predetermined frequency to determine whether or not the SPA database includes a new entry;
   responsive to determining that the SPA database includes the new entry, updating, by the one or more processors, the ML model based on the new entry; and
   predicting, by the one or more processors utilizing the ML model, a new set of SPA opportunities that each have a respective new cost and a respective new confidence interval based on the SKU, the customer type, the customer address, and the historical SPAs.

5. The AI based method of claim 1, wherein predicting the set of SPA opportunities further comprises:
   holding the SKU fixed while executing the ML model; and
   adjusting the customer name while executing the ML model.

6. The AI based method of claim 5, further comprising:
determining, by the one or more processors, that each SPA opportunity of the set of SPA opportunities fails to satisfy the confidence interval threshold; and
predicting, by the one or more processors executing the ML model, a subsequent set of SPA opportunities by inputting the SKU, the customer name, the customer address, and the historical SPAs into the ML model, the customer name being held fixed during execution of the ML model, and the SKU being adjusted during execution of the ML model.

7. The AI based method of claim 6, further comprising:
determining, by the one or more processors, that each SPA opportunity of the subsequent set of SPA opportunities fails to satisfy the confidence interval threshold; and
predicting, by the one or more processors executing the ML model, a second subsequent set of SPA opportunities by inputting the SKU, the customer name, the customer address, and the historical SPAs into the ML model, and both the customer name and the SKU being held fixed during execution of the ML model.

8. An artificial intelligence (AI) based system for predicting opportunities for special pricing agreements (SPA), comprising:
one or more processors; and
a memory storing computer-readable instructions that, when executed, cause the one or more processors to:
receive a user input indicating a stock keeping unit (SKU), a customer name representative of a customer, and one or more filters corresponding to the SKU or the customer name,
search an SPA database to retrieve a set of SPA data associated with the SKU and the customer name, the set of SPA data including: (i) a customer type associated with the customer, (ii) a customer address associated with the customer, and (iii) any historical SPAs corresponding to the customer,
filter, by executing a machine learning (ML) model configured to prioritize SPA data within the set of SPA data based on the one or more filters by applying a decision tree, the set of SPA data to generate a filtered set of SPA data, wherein the decision tree is trained to output the filtered set of SPA data by:
inputting, into the decision tree, feature vectors representing training SPA data and labels classifying the training SPA data,
determining, by the decision tree, classifications corresponding to the training SPA data, and
adjusting weights or parameters of the decision tree based on the classifications and the labels,
predict, by applying the ML model to the filtered set of SPA data, a set of SPA opportunities that each have a respective cost and a respective confidence interval and that satisfy a confidence interval threshold by inputting the filtered set of SPA data into the ML model,
determine a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities,
transmit a notification of the first SPA opportunity and the second SPA opportunity for display to the customer,
track an outcome of a transmission of the first SPA opportunity or the second SPA opportunity to the customer, and
retrain the ML model based on the outcome indicating an acceptance or a rejection of the first SPA opportunity or the second SPA opportunity by the customer.

9. The AI based system of claim 8, wherein the instructions, when executed, further cause the one or more processors to:
receive an indication that the first SPA opportunity or the second SPA opportunity is selected by the user for the transmission to the customer; and
track the outcome of the transmission of the first SPA opportunity or the second SPA opportunity to the customer.

10. The AI based system of claim 8, wherein the SPA database includes (i) a set of historical transactions corresponding to executed sales that include a sale price and cost, and (ii) a set of open contracts corresponding to non-executed sales that include a hypothetical sale price and a hypothetical cost.

11. The AI based system of claim 8, wherein the instructions, when executed, further cause the one or more processors to:
check the SPA database in real-time at a predetermined frequency to determine whether or not the SPA database includes a new entry;
responsive to determining that the SPA database includes the new entry, update the ML model based on the new entry; and
predict, by utilizing the ML model, a new set of SPA opportunities that each have a respective new cost and a respective new confidence interval based on the SKU, the customer type, the customer address, and the historical SPAs.

12. The AI based system of claim 8, wherein the instructions, when executed, further cause the one or more processors to predict the set of SPA opportunities by:
holding the SKU fixed while executing the ML model; and
adjusting the customer name while executing the ML model.

13. The AI based system of claim 12, wherein the instructions, when executed, further cause the one or more processors to:
determine that each SPA opportunity of the set of SPA opportunities fails to satisfy the confidence interval threshold; and
predict, by executing the ML model, a subsequent set of SPA opportunities by inputting the SKU, the customer name, the customer address, and the historical SPAs into the ML model, the customer name being held fixed during execution of the ML model, and the SKU being adjusted during execution of the ML model.

14. The AI based system of claim 13, wherein the instructions, when executed, further cause the one or more processors to:
determine that each SPA opportunity of the subsequent set of SPA opportunities fails to satisfy the confidence interval threshold; and
predict, by executing the ML model, a second subsequent set of SPA opportunities by inputting the SKU, the customer name, the customer address, and the historical SPAs into the ML model, and both the customer name and the SKU being held fixed during execution of the ML model.

15. A non-transitory computer readable medium containing program instructions for predicting opportunities for special pricing agreements (SPA) that when executed, cause a computer to:
- receive a user input indicating a stock keeping unit (SKU), a customer name representative of a customer, and one or more filters corresponding to the SKU or the customer name;
- search an SPA database to retrieve a set of SPA data associated with the SKU and the customer name, the set of SPA data including: (i) a customer type associated with the customer, (ii) a customer address associated with the customer, and (iii) any historical SPAs corresponding to the customer;
- filter, by executing a machine learning (ML) model configured to prioritize SPA data within the set of SPA data based on the one or more filters by applying a decision tree, the set of SPA data to generate a filtered set of SPA data, wherein the decision tree is trained to output the filtered set of SPA data by:
  - inputting, into the decision tree, feature vectors representing training SPA data and labels classifying the training SPA data,
  - determining, by the decision tree, classifications corresponding to the training SPA data, and
  - adjusting weights or parameters of the decision tree based on the classifications and the labels;
- predict, by applying the ML model to the filtered set of SPA data, a set of SPA opportunities that each have a respective cost and a respective confidence interval and that satisfy a confidence interval threshold by inputting the filtered set of SPA data into the ML model;
- determine a first SPA opportunity that corresponds to a highest respective confidence interval relative to the respective confidence interval of each SPA opportunity in the set of SPA opportunities, and a second SPA opportunity that corresponds to a lowest cost of the respective cost of each SPA opportunity in the set of SPA opportunities;
- transmit a notification of the first SPA opportunity and the second SPA opportunity for display to the customer;
- track an outcome of a transmission of the first SPA opportunity or the second SPA opportunity to the customer; and
- retrain the ML model based on the outcome indicating an acceptance or a rejection of the first SPA opportunity or the second SPA opportunity by the customer.

16. The non-transitory computer readable medium of claim 15, wherein the program instructions, when executed, further cause the computer to:
- receive an indication that the first SPA opportunity or the second SPA opportunity is selected by the user for the transmission to the customer; and
- track the outcome of the transmission of the first SPA opportunity or the second SPA opportunity to the customer.

17. The non-transitory computer readable medium of claim 15, wherein the program instructions, when executed, further cause the computer to:
- check the SPA database in real-time at a predetermined frequency to determine whether or not the SPA database includes a new entry;
- responsive to determining that the SPA database includes the new entry, update the ML model based on the new entry; and
- predict, by utilizing the ML model, a new set of SPA opportunities that each have a respective new cost and a respective new confidence interval based on the SKU, the customer type, the customer address, and the historical SPAs.

* * * * *